W. W. VOSPER.
PIPE THREADING AND CUTTING APPARATUS.
APPLICATION FILED JULY 5, 1912.

1,084,118.

Patented Jan. 13, 1914.
9 SHEETS—SHEET 1.

WITNESSES:
C. H. Bills.
E. E. Thomas.

INVENTOR.
William W. Vosper,
By Owen & Owen
His attys.

W. W. VOSPER.
PIPE THREADING AND CUTTING APPARATUS.
APPLICATION FILED JULY 5, 1912.

1,084,118.

Patented Jan. 13, 1914.
9 SHEETS—SHEET 2.

WITNESSES:

INVENTOR.
William W. Vosper
By Owen & Owen.
His attys.

W. W. VOSPER.
PIPE THREADING AND CUTTING APPARATUS.
APPLICATION FILED JULY 5, 1912.

1,084,118.

Patented Jan. 13, 1914.

9 SHEETS—SHEET 4.

WITNESSES:
C. H. Bills
E. E. Thomas

INVENTOR.
William W. Vosper
By Owen & Owen,
His attys.

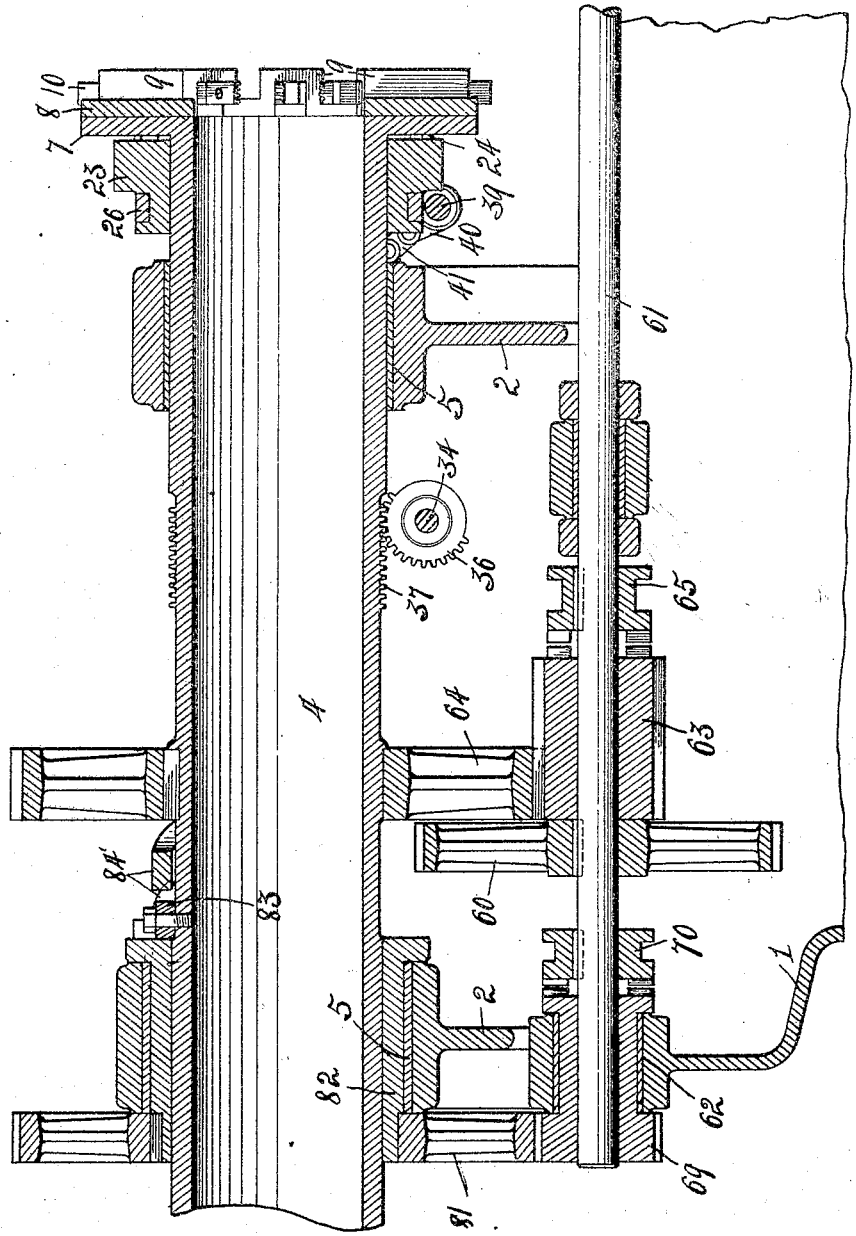

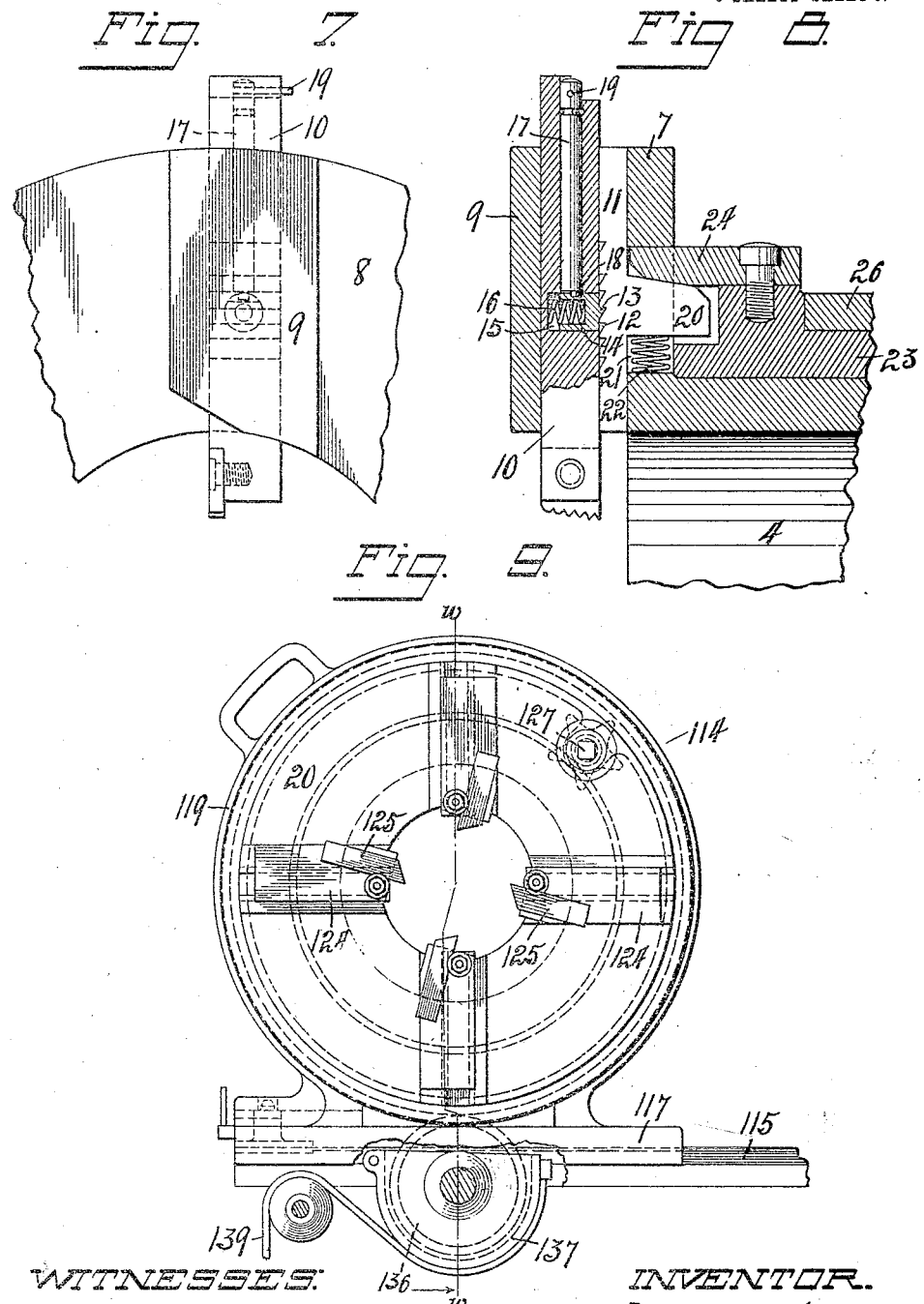

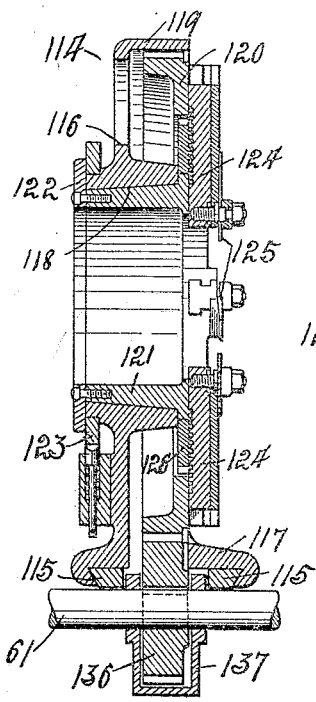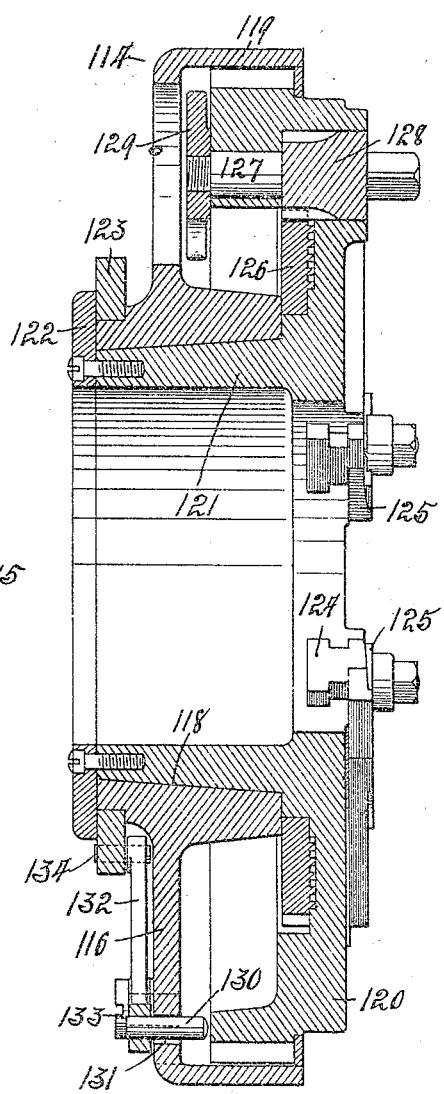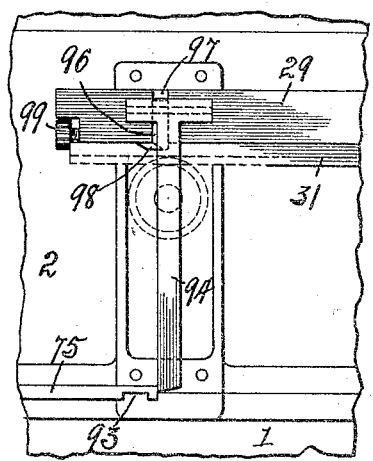

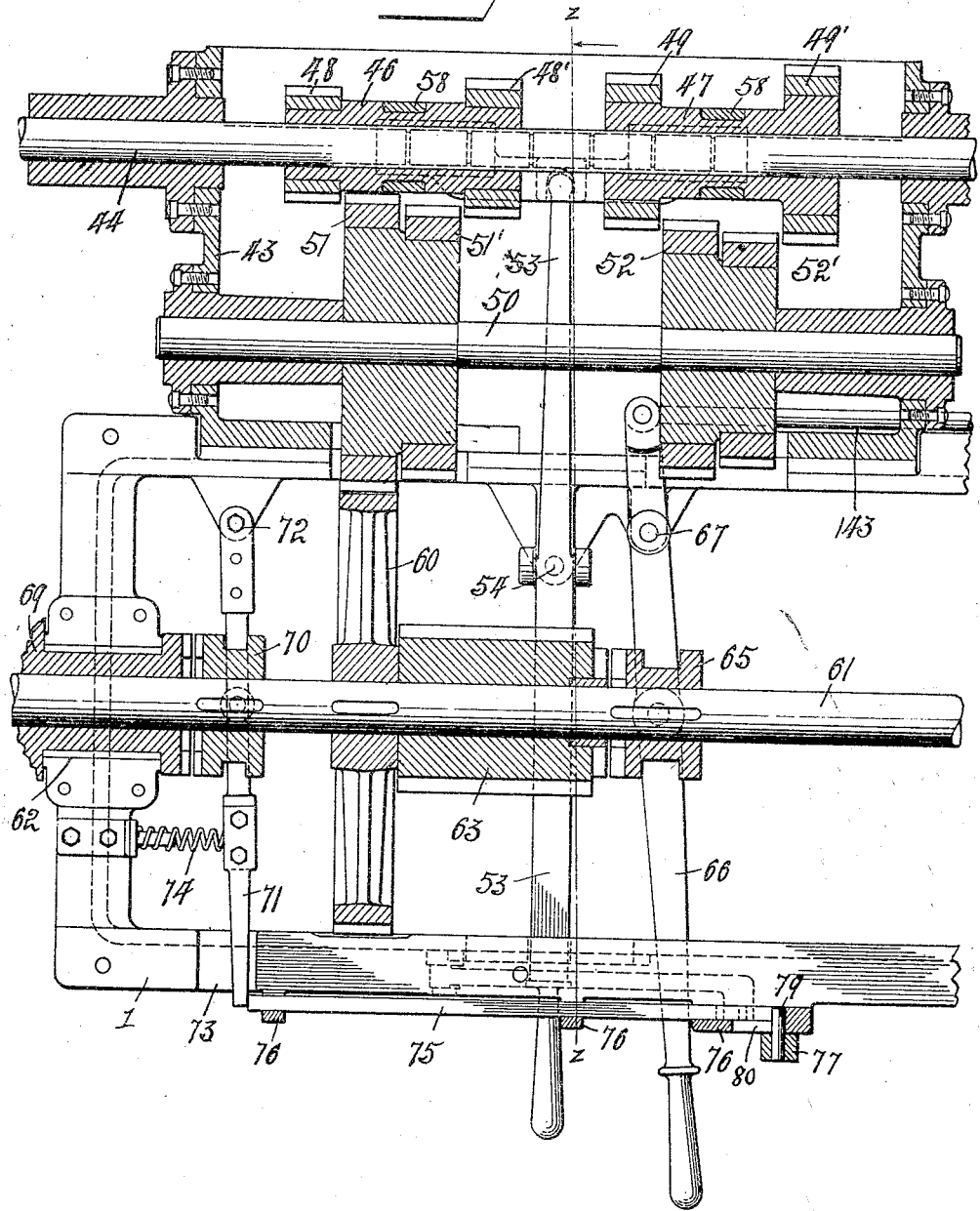

W. W. VOSPER.
PIPE THREADING AND CUTTING APPARATUS.
APPLICATION FILED JULY 5, 1912.

1,084,118.

Patented Jan. 13, 1914.

9 SHEETS—SHEET 9.

WITNESSES:
C. H. Bills.
C. E. Thomas.

INVENTOR.
William W. Vosper,
By Owen & Owen,
His attys.

UNITED STATES PATENT OFFICE.

WILLIAM W. VOSPER, OF TOLEDO, OHIO, ASSIGNOR TO THE TOLEDO PIPE THREADING MACHINE COMPANY, OF TOLEDO, OHIO, A CORPORATION OF OHIO.

PIPE THREADING AND CUTTING APPARATUS.

1,084,118. Specification of Letters Patent. Patented Jan. 13, 1914.

Application filed July 5, 1912. Serial No. 707,711.

*To all whom it may concern:*

Be it known that I, WILLIAM W. VOSPER, a citizen of the United States, and a resident of Toledo, in the county of Lucas and State of Ohio, have invented a certain new and useful Pipe Threading and Cutting Apparatus; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates particularly to machines adapted for the cutting and threading of pipes, rods, or the like, but is not restricted to such purpose, as it may be used in any connection for which it may be adapted or appropriate.

The primary object of my invention is the provision of a power machine of this character, which is simple and efficient in its operation, strong and durable in its construction, and capable of being easily and quickly changed to adapt it for either the threading of work or cutting of work, as desired.

Further objects and advantages of the machine will be apparent from the following description.

The invention is fully described in the following specification, and while, in its broader aspect, it is capable of embodiment in numerous forms, a preferred embodiment thereof is illustrated in the accompanying drawings, in which,—

Figure 1:
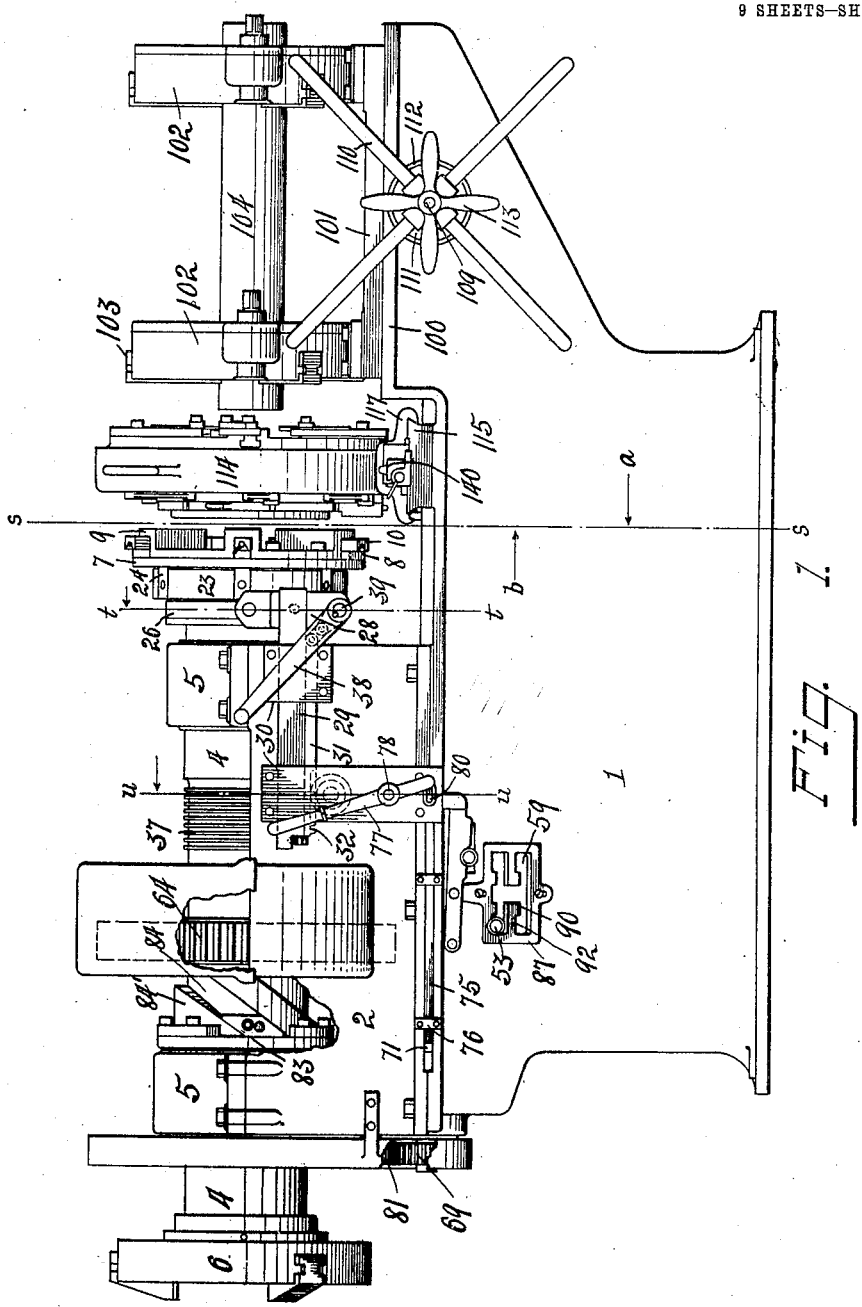
Figure 2:
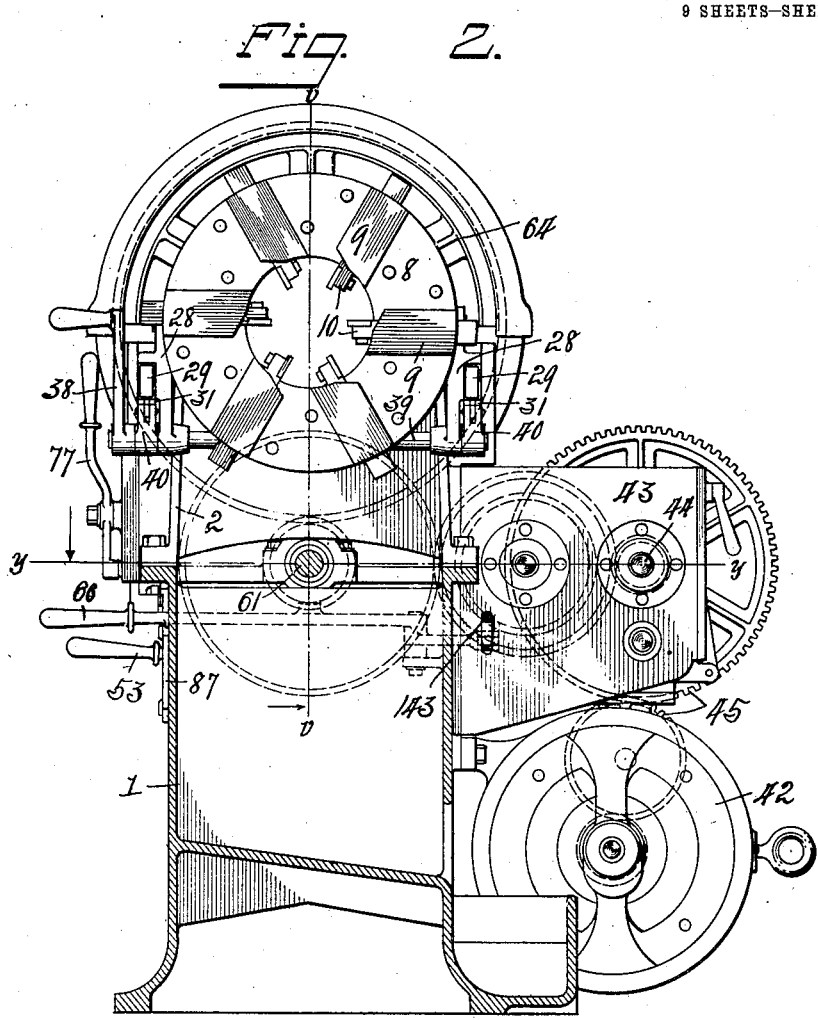
Figure 3:
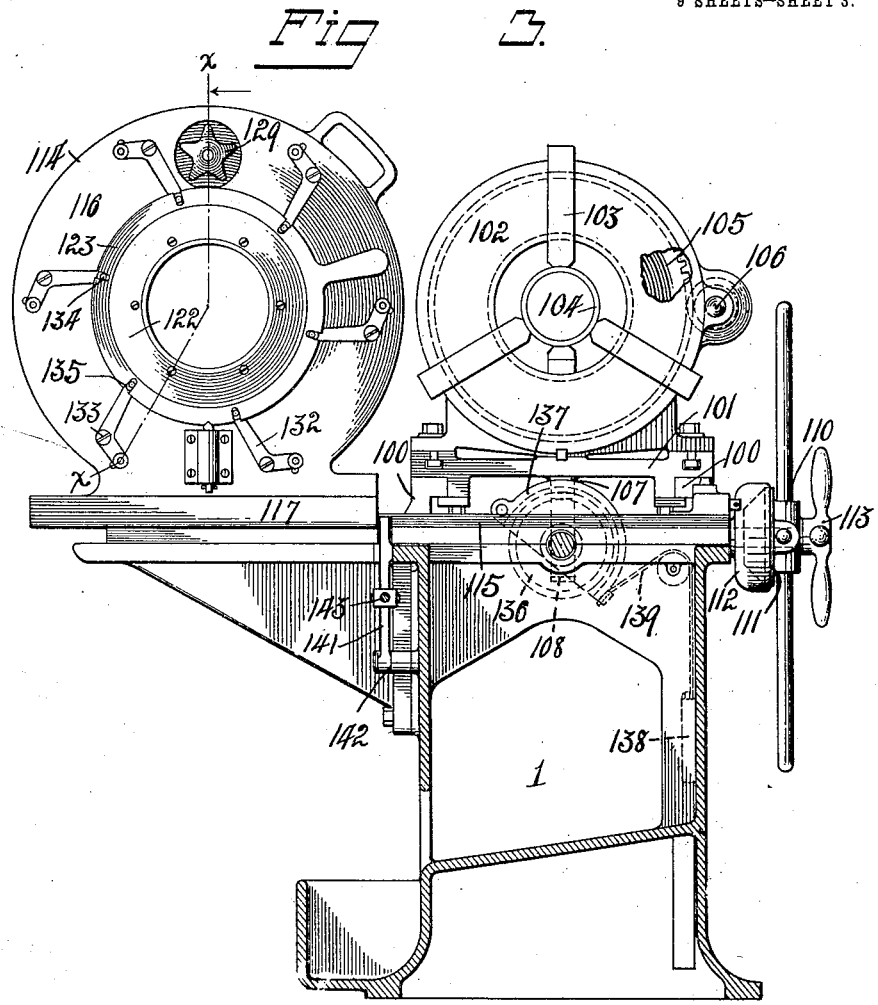
Figure 4:
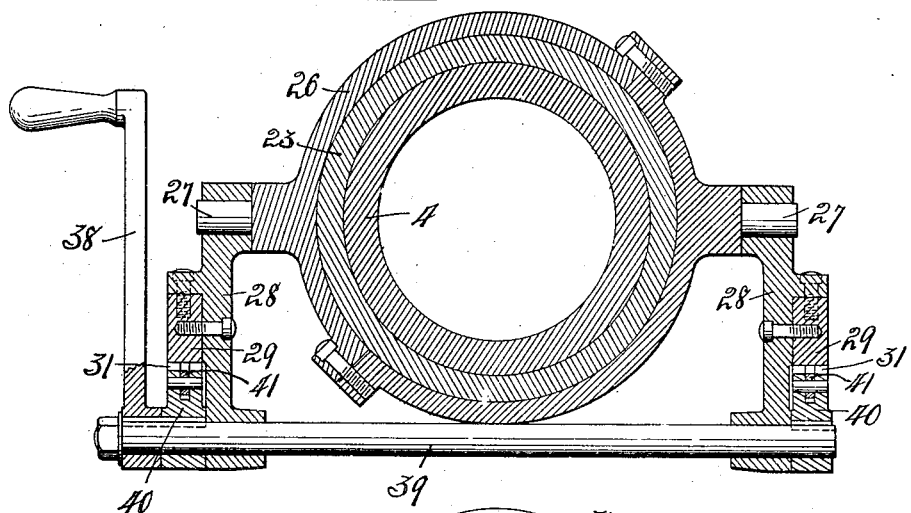
Figure 5:
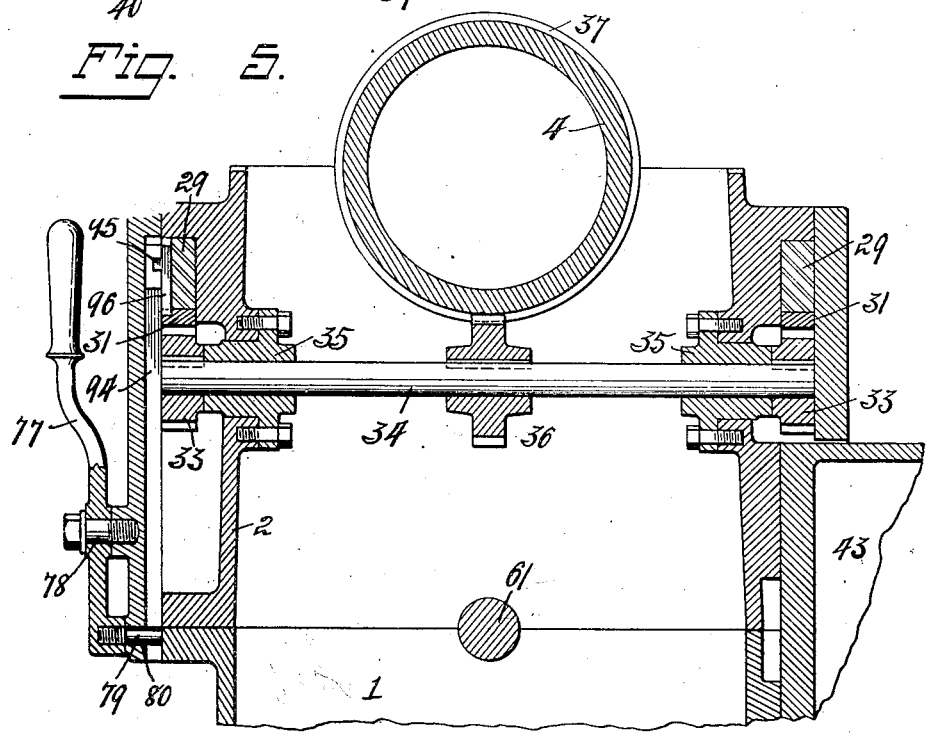
Figure 13:
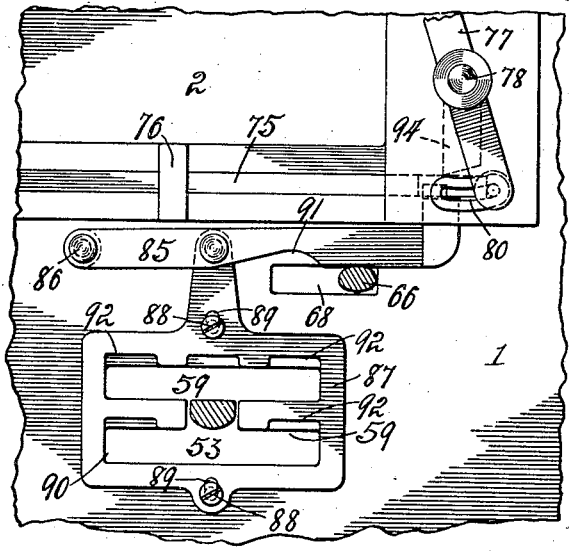
Figure 14:
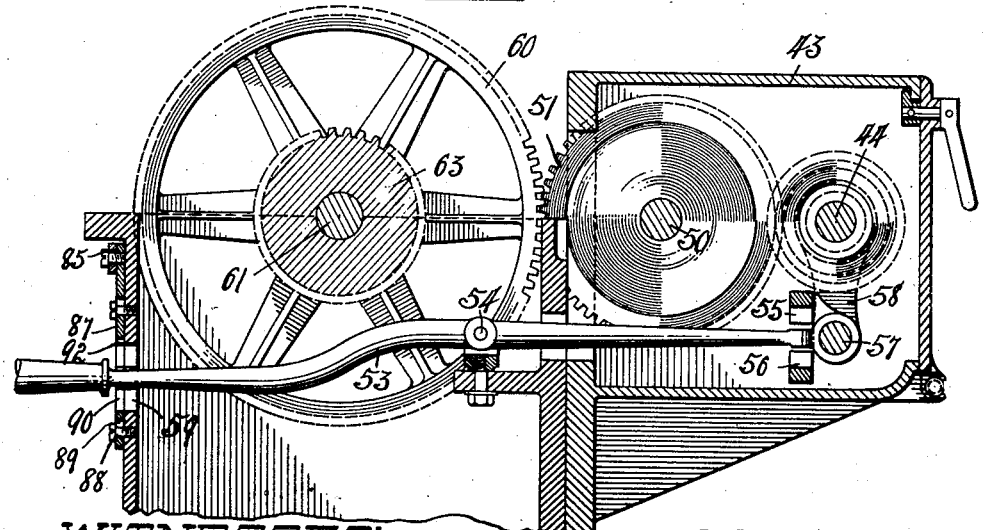

Figure 1 is a front side elevation of a machine embodying the invention with parts broken away. Figs. 2 and 3 are cross-sections on the line s, s in Fig. 1 looking in the directions indicated by the arrows a and b, respectively. Figs. 4 and 5 are cross-sections on the lines t, t and u, u, respectively, in Fig. 1. Fig. 6 is a partial longitudinal section on the line r, r in Fig. 2. Figs. 7 and 8 are different details, with the latter in section, of the chaser adjusting means of the threading head. Fig. 9 is a side elevation of the cutting head in operative position, with a portion broken away. Fig. 10 is a cross-section on the line w, w in Fig. 9. Fig. 11 is an enlarged cross-section on the line x, x in Fig. 3. Fig. 12 is a horizontal cross-section taken on the line y, y in Fig. 2, with parts broken away. Fig. 13 is an enlarged detail of the control lever locking means and associated parts, with the control parts in inoperative position. Fig. 14 is a cross-section on the line z, z, in Fig. 12 and Fig. 15 is a detail of a portion of the locking means for the control parts.

Referring to the drawings, 1 designates the hollow base frame of a machine embodying the invention, and 2 a rectangular frame part which is mounted upon the left end portion of the frame. A hollow shaft or barrel 4 is mounted longitudinally of the frame in bearings 5, 5 provided in the ends of the frame part 2, and has its outer end terminating beyond the outer or left-hand end of the frame and carrying, in the present instance, a work-holding chuck 6 of any suitable construction. This chuck is not used when work is being threaded or cut but enables the machine to be used as a rotary vise if desired. The inner end of the shaft or barrel 4 terminates without the inner or right hand end of the frame part 2, in the present instance, adjacent to the longitudinal center of the base frame, and has such end formed with an outwardly projecting annular flange 7 to which a suitable pipe threading means is attached for rotation with the barrel. This pipe threading means is shown, in the present instance, as comprising a ring-like chaser-carrying head 8, which is formed on its outer side with a series of equidistantly spaced projections or bosses 9, which are radially recessed to carry radially movable thread cutting chaser-bars 10 therein, as best shown in Figs. 6, 7 and 8.

Chaser adjusting blocks 11 are mounted in the recesses with the chaser-bars 10 at the inner sides thereof and are provided on their chaser coacting sides with a series of notches 12 with which a tooth 13 on a plunger 14, that works in a transversely disposed recess 15 in the associated chaser-bar, normally engages to retain the chaser-bar and adjusting block in predetermined positions of relative longitudinal adjustment. A coiled spring 16 is mounted in the base of the plunger recess 15 and acts on the plunger to influence an engagement of its tooth with a registering notch 12. A retraction of the plunger tooth from engagement with the notch 12 is effected by the turning of a key 17. which is mounted in the outer end of each chaser longitudinally thereof and has its inner end provided with a stud 18, which is offset from the key center and adapted to work in a transverse recess in a side of the plunger 14, whereby reciprocatory movements are imparted to the plunger from a rotation of the key. A handle 19 projects laterally from the outer end portion of the key to facilitate a turning thereof. Each chaser-adjusting block 11 has a finger 20 projecting laterally therefrom through a registering opening 21 in the inner side of the flange 7 and is influenced to move outward radially of the die carrying head by the action of the coiled expansion spring 22 thereon, which spring is mounted between the finger and the inner end of the opening 21, as shown in Fig. 8.

A collar 23 encircles the inner end portion of the barrel 4 adjacent to the flange 7 for reciprocatory movements longitudinally thereof and carries a plurality of fingers 24, which project therefrom longitudinally of the barrel and are adapted to work into registering ones of the flange openings 21 without the respective fingers 20. The fingers 20 and 24 have their coacting sides tapered to cause an inward depression of the fingers 20 and attached blocks 11 against the tension of the springs 21 when the fingers 24 are moved toward the blocks 11 and into the openings 21, and vice versa. It is thus apparent that a slow outward movement of the fingers 24, from the position shown in Fig. 8, will permit the chaser-bars 10 to have slow outward radial movements for the purpose of imparting a taper to the thread being cut, the degree of taper being regulated by the taper of the coacting surface of the fingers 20 and 24 or by the relative speed of outward movement of the fingers 24 to the speed of rotation of the thread cutting means.

A yoke 26 loosely encircles the collar 23 and is provided at opposite sides thereof with horizontally projecting trunnions 27, 27, which are mounted in the upper ends of bearing arms 28. 28. as best shown in Fig. 4. These arms are fixed to the forward ends of bars 29, 29, which extend rearwardly therefrom, or toward the left end of the machine, and are mounted for horizontal reciprocatory movements in guides 30, 30 attached to the outer sides of the frame part 2. A rack-bar 31 is mounted below each bar 29 for movement therewith, or relative thereto, in the guides 30 and has rack-teeth 32 provided at the under side of its left hand end portion and meshing with a pinion 33 on the respective end of a shaft 34, which is mounted transversely of the frame part 2 in bearings 35 in the sides thereof, as best shown in Fig. 5. The shaft 30 carries a pinion 36 beneath the barrel 4 and in mesh with a series of annular rack-teeth 37 therein, whereby longitudinal movements of the barrel 4, which are imparted thereto, as hereinafter described, are communicated to the rack-bars 31. The movements of the collar 23 longitudinally of the barrel to throw the fingers 24 into or out of chaser depressing position are manually controlled by a crank-arm or lever 38, which is carried by a shaft 39 that is mounted transversely of the barrel in the lower downwardly projected ends of the arms 28, 28, said shaft in turn having rock-arms 40 at or adjacent to the ends thereof, which arms are connected by links 41 to the forward ends of the respective rack-bars 31. With this form of control for the collar 23 it is apparent that an upward swinging of the crank-arm 38 from its position, as shown in Fig. 1, will effect a retraction or outward movement of the fingers 24 from engagement with the chaser adjusting fingers 20 due to the rack-bars 31 being held stationary relative to the barrel 4 by the rack and pinion connection therebetween. It is also apparent that a reverse movement of the collar is effected by a rearward throwing of the crank-arm 38 from upright position to its inclined position shown in Fig. 1.

The rock-arm and link connection 40—41 between the rack-bars 31 and shaft 39 is such that when the crank-arm 38 is in the operative thread cutting position shown in Fig. 1, a longitudinal movement of the rack-bars 31 toward the right hand end of the machine will be communicated through the arm 28 and yoke 26 to the collar 23. In order to cause the collar 23 to have a relatively slower forward feeding movement than the barrel 4 during the thread cutting operation to effect a slow retraction of the fingers 24 and permit consequent slow outward radial movements of the thread cutting chasers to impart the desired taper to the thread being cut, the pinions 33 are of smaller diameter than the pinion 36 on the shaft 34, thus causing the rack-bars 31 to have a relatively slower forward feeding movement than the barrel.

The barrel 4, in the present instance, is driven from an electric motor 42 through suitable gearing, which preferably has a change speed mechanism in train therewith. This change speed mechanism is mounted in a housing part 43 at the rear side of the base frame 1 and has its drive-shaft 44 in connection with the motor-shaft through a set of gears 45, and said shaft carries two sleeves 46 and 47, which in turn carry the spaced pinions 48, 48' and 49, 49', respectively. A second shaft 50 is mounted within the housing 43 in parallelism with the shaft 44, and carries gears 51 and 51' for mesh respectively with the pinions 48 and 48', and gears 52 and 52' for mesh respectively with the pinions 49 and 49'. The sleeves 46 and 47 are feathered to the shaft 44, and their shifting movements are controlled by a lever 53, which is fulcrumed to the frame, as at 54, and has its forward end projected through the front side of the base frame 1. The inner end of the lever 53 is adapted to be moved upward or downward from neutral position into engagement with forked fingers 55 and 56, respectively, which fingers are mounted for shifting movements on a shaft 57, mounted in the housing 43 below the shaft 44, and each has an arm 58 attached thereto and respectively engaging the sleeves 46 and 47. The pinions on the shaft 44 may be selectively shifted into engagement with the respective gears, as the desired speed of driving of the barrel 4 may require. The outer end of the control lever 53 works through an H-slot form of guide 59 in the front side of the base frame 1, as shown in Figs. 1, 13 and 14. This guide coacts with the lever 53 to guide the shifting movements thereof, as is well understood in the art.

One of the gears on the shaft 50, the gear 51 in the present instance, meshes with gear 60 on a shaft 61, which shaft is mounted longitudinally of the base frame 1 in suitable bearings 62 therein. This shaft carries a loose gear 63 in mesh with a gear 64, which is keyed to the barrel 4. A movable clutch member 65 is mounted for shifting movements on the shaft 61 and is adapted to be moved into or out of clutch engagement with the adjacent end of the gear 63 by a movement of a shift lever 66, which is fulcrumed to the frame, as at 67, and has its free end projecting horizontally without the front side of the base frame 1 through a slot 68 therein (see Figs. 12 and 13).

The outer left hand end of the shaft 61 is provided without the base frame 1 with a loose gear 69, which has a sleeve projecting therefrom through the adjacent bearing 62 and provided at its inner end with a clutch surface with which a movable clutch member 70, on the shaft 61, may be engaged. A shift-lever 71 for the clutch member 70 is fulcrumed at the rear of such member, as at 72, and has its forward end projected through a slot 73 in the front side of the base frame 1. The lever 71 is normally held in clutch released position by a spring 74, and is shifted to clutch engaging position by a movement to the left of a slide-bar 75, which is mounted in guides 76 at the front side of the base frame, with its left hand end in contact with the outer end of the lever 71, as best shown in Fig. 12. A control lever 77 for the shift bar 75 is fulcrumed to the front side of the frame part 2, as at 78, Figs. 1, 2 and 5, and has a pin 79 projecting inward from its lower end through a slot 80 in the frame and in position to have lateral contact with the right hand end of the bar 75. It is apparent with this arrangement of clutch control that a shifting of the upper end of the lever 77 to the right will move the bar 75 and shift-lever 73 from normal positions and effect an engagement of the clutch member 70 with its companion to communicate rotation from the shaft 61 to the gear 69.

The gear 69 meshes with a gear 81, which is keyed to a sleeve 82 that encircles the barrel 4 and projects from said gear through the adjacent bearing 5, being radially flanged at its opposite end to act against the end of the bearing 5 in opposition to the gear 81 to anchor such gear and sleeve against longitudinal movements relative to the frame. The connection between the sleeve 82 and shaft 61 is such as to cause the sleeve to rotate at a slightly different speed from the barrel 4, and this feature, in conjunction with a fixed block 83 on the barrel 4 working in a spiral groove 84 which is formed in a part 84' that is bolted or otherwise suitably attached to the inner end of the sleeve 82, causes the barrel 4 to feed slowly forward or to the right, when both gears 64 and 81 are being driven. In the present instance, the gear 81 has one less tooth than the gear 64 to make the desired difference in the speed of driving of the barrel 4 and sleeve 82.

In order to render it necessary to set the change speed mechanism for the proper speed of driving the barrel 4 to suit the diameter of the pipe to be threaded, before throwing either clutch member 65 or 70 into engagement with its companion, I provide a simple lock mechanism for such purpose. This mechanism (see Fig. 13) comprises a horizontally-disposed arm 85 which is pivoted to the front of the base frame 1, as at 86, and extends over the H-slot 59 and rests adjacent to its free end upon the lever 66. A plate 87 is suspended from the arm 85 for vertical movements therewith, being guided in such movements by screws 88 projecting through vertically-disposed slots 89 in said plate and attaching to the front of the frame 1, said plate having a guide slot 90 therein which is of similar shape to and registers with the guide slot 59 in the base frame. When the plate is in the raised position shown in Fig. 13, the control lever 53 for the shift gears of the change speed mechanism can be moved into any one of the arms of the H or other suitable form of guide slot which is provided by the slots 59 and 90 in the frame 1 and plate 87. When the lever 66 is shifted to throw the clutch 65 into engagement with its companion, such lever moves into register with a notch or under-cut 91 in the arm 85, thus permitting said arm and the plate 87 carried thereby to lower into position to lock the lever 53 in shifted position due to an associated notch or recess 92, one of which is provided in the upper wall of each of the arms of the slot 90, moving down over the lever 53, as indicated in Fig. 1, thus locking the lever against movement from such position until the plate 87 has been raised for such purpose.

The arm 85 in addition to coöperating with the plate 87 to lock the lever 53 in shifted position also has the free end thereof turned upward and adapted to enter a registering notch 93 (see Fig. 15) in the shift-bar 75 when such arm is in the elevated position in which it is held by the lever 66 when not in engagement with its clutch, thus preventing a shifting of the bar 75 to throw its clutch 70 into engagement until the lever 66 has first been thrown to place its clutch into engagement. When the bar 75 is shifted to clutch engaging position and the crank arm 38 is thrown into position to force the fingers 24 into chaser depressing position, as shown in Fig. 1, a lock-bar 94 (see Figs. 5 and 15), drops by gravity into position for its lower end to engage the forward or right hand end of the shift-bar 75 and prevent a retraction thereof from clutch engaging position while the fingers 24 are in chaser depressing position. The upper end of the lock-bar 94 is provided with a cross arm having a horizontal race in its inner side in which a stud 95 on a dog 96 works. The dog 96 is mounted for vertical reciprocatory movements in a vertical recess 97 in the outer side of the associated bar 29 and has its nose or lower end projected into a recess 98, which is provided in the top edge of the associated rack-bar 31 and registers therewith when the bars 29 and 31 are in the positions which they assume when the crank-arm 38 is in its operative position. The rear end wall of the recess 98 and the nose of the dog 96 are provided with beveled surfaces which coact to effect a raising of the dog to move the lock-bar 94 out of locking engagement with the shift-bar 75 when the bars 29 and 31 are relatively moved by a shifting of the crank arm 38 to inoperative position.

An adjusting screw 99 (Fig. 15) is threaded into the rear end of the bar 29 and has its head coacting with the rear end of the bar 31 to limit the relative shifting movements of such bars which is occasioned by a movement of the crank arm 38 to operative position, thus gaging the minimum diameter of a thread to be cut, as the less the relative movement of said bars the less will be the chaser depressing movements of the fingers 24.

The right hand end of the base frame 1 is formed in spaced relation to the frame 2 with longitudinally extending guides 100, which support and guide a table 101 for longitudinal reciprocatory movements thereon, as best shown in Figs. 1 and 3. Rising in fixed relation from the top of the table 101, in the present instance, are two work holding heads 102, 102 each of which is provided with a plurality of radially movable bars 103 for coöperating to clamp a pipe or other work 104 in centered position relative to the threading head 8. The clamping bars 103 of each clamping head have radial clamping movements imparted in unison thereto by the rotation of a scroll-disk 105, as is common in apparatus of this class. A key-shaft 106 carries a pinion in mesh with teeth on the periphery of the disk 105.

It is to be understood that while I have shown a particular form of work clamping means, any suitable means may be provided for such purpose.

The table 101 has a rack-bar 107 provided centrally on its under side longitudinally thereof with which a pinion 108, that is carried by a transverse shaft 109, meshes. The shaft 109 projects without a bearing in the front side of the frame base and has a multiple-arm control wheel 110 secured thereto. The inner side of the hub portion of the hand wheel is provided with a friction clutch member 111 which fits into a complemental clutch member 112 that is fixed to the frame. A multiple arm nut 113 is threaded to the outer end of the shaft 109 and is adapted to act on the hub portion of the control-wheel 110 to force its inner end into clutch engagement with the part 112 to lock the table 101 in adjusted position.

A pipe cutting mechanism 114 is mounted for sliding movements transversely of the frame 1 between the threading head 8 and the inner work clamp 102, being guided in such movements by the way 115, which has dovetailed engagement with the base of said mechanism, as shown in Figs. 1, 3 and 10. This way has an extension beyond the rear side of the machine frame to enable the cutter to be moved from between the work threading and clamping parts to the inoperative position shown in Fig. 3 when not in use. The cutter head 114 comprises an annular casing part 116 which rises from the base 117 that is mounted on the way 115, and has its hub portion forming a central opening 118 and its outer edge laterally flanged, as at 119. A master gear 120 is mounted at one side of the casing 116 and has its toothed portion working within the flanged portion 119 of the casing, and has a laterally projecting hub 121 which is journaled in the opening 118 of the casing. A ring 122 is fixed to the outer end of the gear hub 121 and coacts with the respective end of the casing hub to hold the gear 120 thereto and also serves to retain a ring 123 for rotary movements on the outer hub end of the casing. The gear 120 has a plurality of bars 124 mounted for radial movements therein and each carrying a cutting die 125, as well understood in the art. The bars 124 are provided on their inner sides with teeth for meshing with a spiral scroll on the side of a gear 126, which gear is mounted within a part of the master gear 120 for rotation relative thereto.

The master gear 120 carries a stub-shaft 127 adjacent to the outer edge thereof on which is mounted a pinion 128 in mesh with a gear 126. This shaft also carries a star wheel 129, which is intermittently rotated by striking pins 130 arranged at predetermined points in its path of revolution, thus causing rotation to be intermittently communicated to the gear 126 to impart inward radial adjustment to the cutting dies 125 when the cutter is in operation. The pins 130 project inward through registering slots 131 in the casing 116 from the outer ends of levers 132, which levers are fulcrumed to the outer side of the casing, as at 133, and are provided at their inner ends with laterally projecting pins 134, which work in radial recesses 135 in the ring 123. It is thus apparent that a turning of the ring 123 in one direction will move the levers 132 to throw the pins 130 into the path of movement of the star wheel 129 to cause automatic inward radial adjustment to be imparted to the cutter dies during a cutting operation. When the cutter head is drawn forward into operative position with its work receiving opening in axial register with the work-receiving openings of the work holders 102 the master gear 120 thereof is in mesh with a drive pinion 136 on the shaft 16, thus enabling the cutter parts to be driven from said shaft (see Fig. 9). A guard 137 is mounted for free revoluble movements on the shaft 61 around the gear 136 and is influenced by a weight 138, attached thereto by a strap 139 (see Fig. 3), to normally stand in the position shown in Fig. 3 to cover and guard the upper portion of said pinion. When the cutter 114 is pulled forward into operative position the forward end of its base 117 coacts with the adjacent side edge of the guard 137 and throws such guard into the inoperative position shown in Figs. 9 and 10 to permit a meshing of the gears 120 and 136. 140 designates any suitable form of locking means, which is carried by the forward end of the way 115 and is adapted to engage the forward end of the cutter base 117, when in operative position, to retain the same in such position. While I have shown a particular construction of work-cutting mechanism it is to be understood that the invention is not limited to the use of such means, as any suitable cutting means may be provided.

141 designates a rocker-arm which is fulcrumed, as at 142, to the rear side of the frame 1 in position for its upper end to be swung in advance of the forward end of the cutter head bars 147, as shown in Fig. 3, and is connected by a control rod 143 to the lever 66, whereby a movement of such lever to engage its clutch with the pinion 63 will swing the arm 141 to cutter head locking position, thus preventing a forward movement of such head when the threading mechanism is being operated.

The operation of the machine is as follows: When using the machine for the purpose of cutting a thread on a pipe, rod, or the like, the operator projects the work, 104, to be threaded through the holders 102 by which it is clamped in centered relation to the threading parts, the end to be threaded being disposed in suitable position for the threading means to work thereover when the machine is operated. The operator then sets the lever handle 53 for the desired speed of driving of the barrel 4, as the diameter of the work may require, after which the lever 66 is moved to the left to place the clutch member 65 into engagement with its companion to effect a driving of the barrel 4 from the shaft 61, which latter is in turn driven from the drive-shaft 44 through the intermediate speed change mechanism provided for such purpose. The movement of the lever 66 to clutch engaging position permits the arm 85 and attached lock-plate 87 to lower, due to the lever moving into register with the recess 91 in the lower edge of said arm, thus effecting a locking of the speed change lever 53 in shifted position by reason of the registering recess 92 in the lock-plate moving downward thereover. The lowering of the arm 85 also withdraws the upturned free end thereof from locking engagement with the notch 93 in the shift bar 75 to render such bar free to be shifted by a movement of the control lever 77 to throw the clutch 70 into engagement with the clutch end of the pinion 69 for the purpose of driving the gear 81 and feed collar 82 to which it is attached. The operator, however, prior to throwing the lever 77 to effect an engagement of the clutch 69—70, throws the threading die controlling lever 38 to the left, or to the inclined position shown in Fig. 1, in order to shift the collar 23 and fingers 24 carried thereby to die depressing position, as best shown in Fig. 8. In moving the lever 38 to its inclined operative position, the rack-bar 31 stands at rest due to its being anchored to the barrel 4 through the medium of the rack-bar and pinion connection therebetween, so that the lever 38 swings with its point of connection to the bar 31 as its fulcrum, thus causing a forward movement to be imparted to the yoke 26 and attached bars 29, the length of such movement being regulated by an adjusting of the screws 99 which coact with the rear ends of the rack-bars 31 to limit the forward movements of the bars 29 and attached parts relative thereto. A forward movement of the yoke 26 and collar 23, to which it is attached, forces the fingers 24 into depressing engagement with the fingers 20 of the respective chaser adjusting blocks 11. The operator now throws the lever 77 to engage the clutch 69—70 to drive the feed collar 84. The revolving of the barrel 4 and feed collar 84 at slightly different speeds, due to the difference between their respective driving connections with the drive shaft 61, causes a slow forward feeding of the barrel 4 and chaser-carrying head 8 relative to the work by reason of the block 83, which is fixed to the barrel, traveling in the tapered or spiral way 84 in the collar 84'. As the barrel 4 feeds forward the collar 23 moves forward therewith at a slightly slower speed, due to the pinion 36 which meshes with the barrel rack 37 being slightly larger than the pinions 33, which are carried on the shaft with the pinion 37 and mesh with the respective rack-bars 31, which rack-bars are connected with the collar 23, as hereinbefore described. The relative forward feeding movement which is thus imparted to the barrel 4 and fingers 24 causes a slow recession of said fingers from depressing engagement with the chaser fingers 20 to permit a gradual outward movement of the chasers for cutting a tapered thread on the work. The minimum diameter of the thread is regulated by an adjusting of the screw 99, as such adjustment changes the length of the forward stroke of the fingers 24 and consequently the degree of depression of the chasers. When the shift-bar 75 has been thrown to its clutch engaging position the lock-bar 94 drops into locking engagement therewith to prevent its return to normal or clutch released position until the lever 38 has been thrown to vertical or inoperative position to move the fingers 24 to inoperative position. Upon such movement of the lever 38 to its inoperative position a dog 96, which is carried by one of the bars 29 for movement therewith and has engagement with the upper end of the lock bar 94, is raised out of the depression 98 in the associated rack-bar 31 and effects an automatic raising of the lock-bar 94 to inoperative position, thus permitting a throwing out of the clutch 69—70 by the action of the spring 74. When it is desired to cut a pipe the operator first places the speed change lever 53 in the proper position for driving the shaft 61 at a desired speed and then draws the cutter head 114 forward on the way 115 to place the master gear 120 of the cutter into mesh with the pinion 136 on the drive shaft 61, the cutter head being stopped in proper register with the work holding parts by contact of the forward end of its base with a registering stop on the forward end of the way 115. When the cutter head is in operative position it is locked against rearward movement by a suitable lock means 140, which is carried at the forward end of the way 115. The work which is held by the holders 102 can now be moved forward into proper position for cutting by a rotation in the proper direction of the work feeding wheel 110, as is well understood in the art. The barrel 4 being hollow the work may be projected therethrough, if desired. The cutting dies 125 are thrown into commission by a movement of the ring 123 in the proper direction to move the pins 130 into the path of movement of the star wheel 129, as is well understood in the art. When the cutter head 114 is in its inoperative position as shown in Fig. 3, and the threading mechanism is in operation, the former is locked against a forward movement by the rocker-arm 141, which has connection with and is thrown into cutter head locking position by a throwing of the lever 66 into clutch engaging position.

I wish it understood that the invention is not limited to any specific construction or arrangement of the parts, or to the use of any particular forms of threading, cutting and work holding mechanisms, except in so far as such limitations are specified in the claims.

Having thus described my invention, what I claim as new and desire to secure by Letters Patent, is—

1. In combination, a rotatable and axially movable thread-cutting mechanism having movable thread-cutting dies, die controlling means rotatable with said mechanism and axially movable relative thereto to vary the distance between the axis of said mechanism and the cutting points of its dies, said means being quickly retractable in an axial direction from die depressing position, and mechanism operable to impart rotary movements to said thread-cutting mechanism and means and differential axial movements in the same direction thereto.

2. In combination, a rotatable and axially movable thread-cutting mechanism having movable thread cutting dies, means rotatable with said mechanism and shiftable axially thereof and operable to control the movements of the dies of said mechanism to vary the distance between their cutting points and their turning axis, means for imparting rotary and axial movements to said mechanism, manually operated means for quickly shifting said rotatable means in an axial direction relative to said mechanism, and means for communicating axial movements to said die controlling means relative to the axial movements of said mechanism when the mechanism is being operated.

3. In combination, a rotatable and axially movable thread-cutting mechanism having movable thread-cutting dies, die controlling means rotatable with said mechanism and axially movable relative thereto to vary the distance between the axis of said mechanism and the cutting points of its dies, and manually controlled means for quickly moving said die controlling means in the opposite direction relative to said cutting mechanism from the direction in which it is moved by said driving mechanism.

4. In combination, a shaft, a chaser carrying head carried by said shaft, chasers mounted for radial movements in said head, means longitudinally shiftable on said shaft and movable in one direction relative to the shaft to move the chasers inwardly and in the opposite direction to permit an outward movement of the chasers, mechanism for imparting rotary and longitudinal movements to the shaft, and mechanism operable by a longitudinal movement of the shaft to move said means at a slightly different speed longitudinally therewith to permit a gradual outward movement of the chasers.

5. In combination, a revoluble and axially movable chaser carrying head, chasers carried for radial movements by said head, means shiftable axially of said head and having parts which coact with parts of the chasers to permit the chasers to have slow outward radial movements when said means is retracted from the head, and mechanism operable to impart revoluble movements to said head and means and differential axial movements in the same direction thereto.

6. In combination, a rotatable chaser carrying head, chasers carried for radial movements by said head and having laterally projecting parts, a member mounted for rotation with said head and being axially movable relative thereto, said member having parts projecting therefrom for coacting with the laterally projecting parts of the chasers for permitting the chasers to have gradual outward radial movements when said member is moved in one direction axially of the head, said member being rotatable with the head, and mechanism operable to impart rotary movements to the head and differential axial movements in the same direction to said head and member.

7. In combination, a shaft, a head carried by said shaft, chasers carried for radial movements by the head, a collar mounted on said shaft for axial shifting movements relative thereto and having parts for coacting with said chasers to permit the same to have gradual outward radial movements when the collar is moved away from said head, means manually operable to shift said collar relative to the head, mechanism operable to impart rotary and axial movements to the shaft, and means operable by an axial movement of the shaft to impart movement to said collar in the same direction as the axial movement of the shaft but relatively slower.

8. In combination, a shaft, a head carried by the shaft, chasers carried by the head for inward and outward movements relative to its center, means influencing an outward movement of the chasers, a collar mounted on the shaft for rotation with the head and for axial movements relative thereto, said collar having parts for coacting with the chasers for moving the same inward when the collar is moved toward the head and for permitting the chasers to have slow outward movements when the collar is moved away from the head, means manually operable to control the axial movements of said collar, means for rotating the shaft and imparting axial movements thereto, and means for moving the collar axially with the shaft but at a slower speed than the axial movement of the shaft.

9. In combination, a rotatable and axially movable shaft, thread cutting mechanism carried by said shaft and having radially movable chasers influenced to normally move outward, a collar mounted on the shaft for axial shifting movements relative thereto and having parts for coacting with the chasers to move the same inward when the collar is moved toward said mechanism and for permitting gradual outward movements to the chasers when the collar is moved away from said mechanism, means for imparting rotary and axial movements to said shaft, and rack and pinion means for communicating axial movements to said collar in the direction of axial movements of the shaft but at a different speed to the speed of movement of the shaft.

10. In combination, a rotatable and axially movable shaft, a threading mechanism carried by said shaft and having radially movable chasers, means rotatable with and shiftable longitudinally of the shaft and adapted to operate on the chasers to move them inward when said means is shifted in one direction and to permit controlled outward movements of the chasers when the means is moved in the opposite direction on the shaft, means manually operable to shift said chaser controlling means longitudinally of the shaft, means for imparting rotary and longitudinal movements to the shaft, and rack and pinion means connecting said shaft and said manually controlled means for communicating axial shifting movements to said chaser controlling means from longitudinal movements of the shaft in the same direction therewith but at a different speed.

11. In combination, a rotatable and axially movable thread-cutting mechanism having movable thread-cutting dies, die controlling means rotatable with said mechanism and axially movable relative thereto to vary the distance between the axis of said mechanism and the cutting points of its dies, mechanism operable to impart rotary movements to both said thread-cutting mechanism and means and relative axial movements thereto, and means adjustable to limit the axial movements in one direction of the chaser controlling means.

12. In combination, a shaft having a series of circular rack-teeth thereon, a thread-cutting mechanism carried by said shaft and having movable chasers, mechanism for imparting rotary and axial movements to said shaft, means rotatable with said mechanism and axially movable relative thereto and operable to control the movements of the chasers to vary the distance between their cutting points and their turning axis, a rack-bar movable with said means, a countershaft, different sized pinions carried by said countershaft, one in mesh with the shaft rack-teeth and the other in mesh with the rack-bar teeth and operable to communicate axial movements to said means from axial movements of said first shaft.

13. In combination, a rotatable head, chasers carried for inward and outward movements by the head and influenced to normally move outward, means manually shiftable axially of the head and work being acted on and having a part which turns with the head and is adapted to operate on the chasers to move them inward when such part is shifted in one direction relative to the head and to permit gradual outward movements of the chasers when said part is shifted in the opposite direction relative to the head, and mechanism operable by a rotating of the head to impart movements to said means axially of the head.

14. In combination, a rotatable head, chasers carried for radial movements by said head and influenced to normally move outward relative thereto, mechanism for imparting rotary and axial movements to the head, means shiftable axially of the head and having a part for rotation with the head and adapted when moved in one direction relative to the head to operate on the chasers to move them inward and when moved in the opposite direction relative to the head to permit gradual outward movements to the chasers, and means operable by said mechanism to move said first means axially with the axial movements of the head in one direction but slower than such movements of the head.

15. In combination, a rotatable head, chasers carried for radial movements by said head and influenced to normally move outward relative thereto, mechanism for imparting rotary and axial movements to the head, means shiftable axially of the head and having a part for rotation with the head and adapted when moved in one direction relative to the head to operate on the chasers to move them inward and when moved in the opposite direction relative to the head to permit gradual outward movements to the chasers, means operable by said mechanism to move said first means axially with the axial movements of the head in one direction but slower than such movements of the head, and means adjustable to limit the chaser depressing movements of said first means.

16. In combination, a shaft having a series of circular rack teeth thereon, a thread cutting mechanism carried by said shaft and having radially movable chasers which are normally influenced to move outward, mechanism for imparting rotary and longitudinal movements to said shaft, means shiftable longitudinally of the shaft and having a part which is rotatable with the shaft and adapted when moved in one direction to operate on the mechanism chasers to inwardly depress the same and when moved in the opposite direction to permit gradual outward movements of the chasers, a rack-bar movable with said means, a countershaft, different sized pinions carried by said countershaft one in mesh with the shaft rack teeth and the other in mesh with the rack-bar teeth and operable to communicate longitudinal movements to said means from longitudinal movements of the first shaft but at a slower speed than the movements of the first shaft to effect a gradual retraction of said chaser operating part from the head.

17. In combination, a shaft, a thread cutting mechanism carried by said shaft and having radially movable chasers which are normally influenced to move outward relative to the head, mechanism for imparting rotary and axial movements to the shaft, mechanism operable by the longitudinal movements of said shaft for permitting the mechanism chasers to have slow outward movements to cut a tapered thread, and means manually operable to move the chaser coacting parts of said mechanism in unison into operative or inoperative positions.

18. In combination, a head, chasers carried for radial movements by said head, means for imparting rotary and axial movements to the head, control means for said head driving means, mechanism for coöperating with said head driving means to control the outward movements of the chasers to cut a tapered thread, and means for preventing an engaging movement of said control means until said mechanism has been moved to operative position relative to the chasers.

19. In combination, a rotatable and axially movable shaft, a thread cutting mechanism carried by said shaft and having radially movable chasers which are influenced to normally move outward, a member rotatable relative to said shaft and having a part for coacting with a part of the shaft to cause the shaft to have axial movements when it and said member are relatively rotated, separate manually controlled means for imparting differential rotation to said shaft and member, mechanism having a part which is manually movable to move the thread cutting mechanism chasers inward and to permit a slow outward movement thereof and automatically operable, when the shaft is rotating and the chasers are depressed thereby, to permit a gradual outward movement of the chasers for cutting a tapered thread, and means for preventing a stopping of the driving of said member when said chaser control mechanism is in operative position.

20. In combination, a rotatable thread cutting mechanism having radially movable chasers, means operable to depress the chasers and permit slow outward movements thereof in unison, manually controlled means operable to impart axial movements to said mechanism, and means automatically operable to prevent a stopping of said mechanism moving means when said chaser controlling means is in one position of its movement and operable to effect a stopping of the axial moving of said mechanism when said chaser controlling means is in another position of its movement.

21. In combination, a rotatable and axially movable thread cutting mechanism having radially movable chasers, control means for said chasers operable to inwardly depress the chasers or to permit gradual retracting movements thereof, means operable to impart axial movements to said mechanism when rotated, means manually operable to throw said last mentioned means into commission, a member automatically operable to lock said manually controlled means in operative position when the chaser controlling means is in one position of its movement, and means operable by a movement of said chaser controlling means to another position of its movement to release said locking member from locking position.

22. In combination, a rotatable thread cutting mechanism adjustable to suit work of varying diameters, a speed change mechanism, manually controlled means for communicating rotation to the threading mechanism from said speed change mechanism, and means for preventing a shifting of the speed change mechanism when the threading mechanism is being driven.

23. In combination, a work-holder, a thread-cutting mechanism, and a cutting-off mechanism, one of said mechanisms standing in register with the work-holder and the other being movable into and out of register therewith, and means operable to drive said movable mechanism when in operative position and also to drive said other mechanism.

24. In combination, a driving mechanism, a thread-cutting mechanism, and a cutting-off mechanism, one being stationary and the other movable relative to the driving mechanism, means operable to connect the driving and stationary mechanisms, and means automatically operable to connect the driving and movable mechanisms when the latter is moved to operative position.

25. In combination, a work-holder, a thread-cutting mechanism, and a cutting-off mechanism, one being permanently in register with said work-holder and the other being movable into and out of register therewith, a power transmission mechanism operable to automatically connect with and drive said movable mechanism when moved into register with the work-holder, and means operable to connect and disconnect said permanent mechanism and power transmission mechanism.

26. In combination, a frame, a thread cutting mechanism mounted for rotary movements in said frame, work holding means in axial register with said mechanism, means for imparting thread cutting movements to said mechanism, and a cutting mechanism carried by said frame for movements between said thread cutting mechanism and work holding means in axial relation thereto or vice versa, said cutting mechanism having driving connection with said power transmitting means when in operative position between the threading mechanism and work holding means.

27. In combination, a frame, a thread-cutting mechanism and a cutting-off mechanism carried thereby, one being stationary against transverse axial movements and the other being mounted for transverse movements, common drive means for said mechanisms, and means operable to make and break the driving connection between said stationary mechanism and drive means, the driving connection between said drive means and movable mechanism being automatically made and broken by a movement of the movable mechanism to and from its operative position.

28. In combination, a frame, a pipe threading mechanism and a pipe cutting mechanism carried by said frame, one for transverse movements relative to the other to enable them to be placed into or out of axial register, and mechanism for driving the movable mechanism when in one position of its movement and operable to drive the other mechanism when the movable mechanism is in inoperative position.

29. In a machine of the class described, a thread cutting mechanism and a pipe cutting mechanism mounted for relative transverse movements to place them into or out of axial register, power transmitting means for driving the pipe cutting mechanism when in operative position and for driving the thread cutting mechanism, and means operable to automatically lock the pipe cutting mechanism in inoperative position when the thread cutting mechanism is being driven.

30. In a machine of the class described, a frame having its top provided with a transverse way, a cutting mechanism shiftable on said way, drive means mounted in said frame beneath said way and having operative connection with said mechanism when it is in one position of its movement on said way.

31. In a machine of the class described, a frame, a cutting mechanism transversely movable on said frame and having a gear, and drive means having a drive gear with which the gear of said mechanism meshes when the mechanism is in one position of its movement relative to the frame.

32. In combination, a frame, a cutting mechanism transversely movable on said frame and having a gear, drive means having a drive gear in the path of movement of said mechanism and adapted to mesh with the mechanism gear when the latter is in one position of its movement, and means guarding the drive gear when the cutting mechanism is in inoperative position and being automatically movable to uncover said gear when the mechanism is moved to operative position.

33. In combination, a rotatable thread-cutting mechanism having radially movable chasers, means operable to control the radial movements of the chasers, means operable to impart axial feeding movements to said mechanism, and means automatically operable to effect a stopping of the feeding movements of said mechanism when said chaser controlling means is in a predetermined position of its movement.

34. In combination, a rotatable thread-cutting mechanism having radially movable chasers, means operable to impart axial feeding movements to said mechanism, means operable by the feeding movements of said mechanism to permit slow outward movements to said chasers and adjustable means actuated by said last mentioned means and automatically operable to stop the operation of said mechanism when a thread of predetermined length has been cut.

35. In combination, a thread-cutting mechanism mounted for rotary and axial movements and having radially movable chasers, separately controlled means for imparting rotary and axial movements to said mechanism, mechanism for coöperating with said head driving means to control the outward movements of the chasers to cut a tapered thread, and means for preventing a driving of the thread-cutting mechanism until said chaser controlling mechanism has been moved to operative position relative to the chasers.

36. In combination, a thread-cutting mechanism, a drive mechanism, double connection between said mechanisms for communicating simultaneous rotary and axial movements to the former, means automatically operable by the axial movement of said thread-cutting mechanism to control the radial movements of its chasers to cut a tapered thread, and means for preventing a breaking of one of said driving connections between said mechanisms when said chaser controlling means is in operative position.

37. In combination, a thread-cutting mechanism, means for imparting axial movements to said mechanism, means for controlling the radial movements of the mechanism chasers to cut a tapered thread when said mechanism is being axially moved, and mechanism coöperating with said chaser controlling means and automatically operable to disconnect said thread-cutting mechanism and the driving means therefor at a predetermined point in a thread-cutting operation.

38. In combination, a thread-cutting mechanism, means for imparting axial movements to said mechanism and having a control part, chaser controlling means associated with said mechanism and automatically movable relative thereto when said mechanism is being axially moved, and mechanism connecting said chaser controlling means with the control part of said first means for preventing a releasing movement of such part until a thread of predetermined length has been cut.

39. In combination, an axially movable thread-cutting mechanism, means movable relative to said mechanism during an axial movement thereof to control the movements of the mechanism chasers to cut a tapered thread, mechanism for imparting axial movements to said cutting mechanism and having a normally released clutch part, and means automatically operable to lock said clutch part in closed position during a thread cutting operation and to release such part to permit a disconnecting of said driving and cutting mechanisms at a predetermined point in a thread cutting operation.

40. In combination, a thread-cutting mechanism and a pipe cutting mechanism mounted for relative movements to place them into or out of axial register, drive means for said mechanisms, and means for permitting said driving means to drive only one of said mechanisms when they are in register.

41. In combination, a thread-cutting mechanism and a pipe cutting mechanism, one of said mechanisms being stationarily mounted and the other mechanism being movable to place it into or out of axial register with the stationary mechanism, a driving mechanism capable of having driving connection with the stationary mechanism when the movable mechanism is out of register therewith and of having driving connection only with the movable mechanism when in register with the stationary mechanism.

42. In combination, a thread-cutting mechanism and a pipe-cutting mechanism mounted for relative movements to place them into or out of axial register, power transmitting means for driving the thread-cutting mechanism and also for driving the pipe-cutting mechanism when in its operative position, and means operable to prevent a connecting of said power transmitting means and the thread-cutting mechanism when the pipe-cutting mechanism is in operative position.

43. In combination, a pipe-threading mechanism, a pipe-cutting mechanism movable into and out of operative position, a power transmission mechanism operable to communicate rotary and axial movements to the thread-cutting mechanism and to drive said pipe-cutting mechanism when in operative position.

44. In combination, a thread-cutting mechanism, a power transmission mechanism operable to communicate rotary and axial movements to the thread-cutting mechanism, and a pipe-cutting mechanism movable transversely of the thread-cutting mechanism and automatically connecting with said power transmitting mechanism when moved to one position of its movement.

45. In combination, a thread-cutting mechanism carrying shaft, a power transmission mechanism for communicating rotation to said shaft, a work-holder in axial register with said thread-cutting mechanism, and a work-cutting mechanism movable into or out of axial register with said work-holder and adapted when in operative position to have driving connection with said power transmission mechanism.

46. In combination, a thread-cutting mechanism, means for imparting thread-cutting movements to said mechanism, a work-holder in register with said mechanism, a pipe-cutting mechanism movable into or out of axial register with said work-holder and when in axial register therewith having driving connection with said means.

47. In combination, a work-holder, a thread-cutting mechanism and a pipe-cutting mechanism, one being in permanent register with said work-holder and the other being movable into and out of register therewith, a power transmission mechanism adapted to have driving connection with said permanently located mechanism and with said other mechanism when in register with the work-holder.

48. In combination, a thread-cutting mechanism, a drive shaft, a gear driven by said shaft, double manually controlled connection between said shaft and mechanism for communicating rotary and axial movements to the mechanism, a work-cutting mechanism movable transversely of said shaft into and out of driving connection with said gear, and means for preventing a movement of the work-cutting mechanism to its operative position when said shaft is communicating rotary movements to the thread-cutting mechanism.

49. In combination, a thread-cutting mechanism, a drive shaft, means driven by said shaft, manually controlled connection between said mechanism and shaft for communicating rotary movements from one to the other, and a work-cutting mechanism movable relative to said means into and out of driving connection therewith, and means for preventing a driving connection of said shaft and thread-cutting mechanism when the work-cutting mechanism is in operative position.

50. In combination, a thread-cutting mechanism, a drive shaft, means driven by said shaft, separable connection between said shaft and mechanism for communicating rotation from one to the other, a work-cutting mechanism movable relative to said means into and out of driving engagement therewith, and means for preventing a movement of the work-cutting mechanism into engagement with its driving means when said shaft and thread-cutting mechanism are in driving engagement.

51. In combination, a drive gear, a cutting mechanism movable into and out of driving engagement with said gear, and a guard member influenced to normally cover said gear and automatically movable to uncover the gear when said mechanism is moved to gear driving position.

In testimony whereof, I have hereunto signed my name to this specification in the presence of two subscribing witnesses.

WILLIAM W. VOSPER.

Witnesses:
C. W. OWEN,
S. T. KLOTZ.